Dec. 19, 1961

G. L. GOUGH, JR 3,013,739

PUNCHED TAPE HOLDER

Filed May 5, 1959

INVENTOR
GEORGE L. GOUGH, JR.

BY R. C. Terry

ATTORNEY

United States Patent Office 3,013,739
Patented Dec. 19, 1961

3,013,739
PUNCHED TAPE HOLDER

George L. Gough, Jr., Glenview, Ill., assignor to Teletype Corporation, Chicago, Ill., a corporation of Delaware Filed May 5, 1959, Ser. No. 811,133
6 Claims. (Cl. 242—61)

This invention relates to tape storing and handling, and particularly to equipment for storing lengths of record tape and transferring the tapes to a supply reel.

In an integrated data processing system, such as are employed in cost accounting, inventory and production control, message accounting and sale order processing, the handling and storage of relatively small amounts of fixed information and ready access to the information are acute problems. The effectiveness of such data processing systems is increased as apparatus is provided to facilitate inherent tape handling operations.

An object of this invention is to provide a device adapted to receive an elongated tape wound on a flat member and remove the elongated tape from the flat member.

A further object of the invention is to provide a device adapted to remove an elongated tape wound on a flat member and contain the tape in a reel like fashion for a tape supply operation.

A further object of this invention is to provide a structure for storing tape in the form of an elongated loop.

A still further object is to provide a tape storage structure, comprised of a plurality of flat members adapted to store tape and to facilitate easy removal of an elongated tape wound on the structure.

A feature of the invention are a pair of card-like members with each member having a tape retaining projection on each end thereof such that when the cards are placed in superposed relation the projections cooperate to form a generally U-shaped tape retaining trough at each end of the cards.

Another feature of the invention is a receptacle, adapted to receive an accumulation of tape wound on an elongated flat member, having means for spreading the tape away from the sides of the flat member, and means for confining the tape in the form of a loose roll upon removal of the flat member.

A more complete understanding may be obtained from the following detailed description of a specific embodiment of the present invention when read in conjunction with the accompanying drawings in which.

Figure 1:
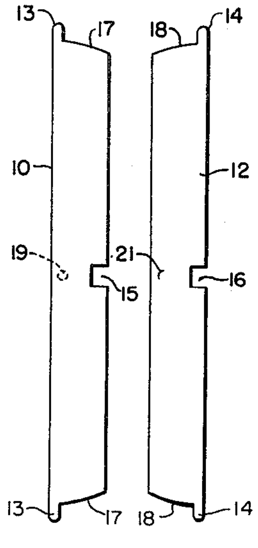
FIG. 1 is a side view showing the outlines of a pair of tape winder cards which may be used to practice the present invention.

Referring now to the drawings, and in particular FIG. 1, there are shown two tape winder cards 10 and 12, made preferably of plastic, having tape retaining projections 13—13 and 14—14, respectively, formed integrally thereon. Winder cards 10 and 12 are provided with rectangular mounting notches 15 and 16, respectively, and with sloping or rounded surfaces 17—17 and 18—18, respectively.

Two countersunk recesses 19 and 21 are formed in cards 10 and 12, respectively, substantially along the horizontal centerline as viewed in FIG. 1, to assist in mounting and retaining the winder cards in a shaft spindle 20 of a conventional tape winder 22.

Figure 6:
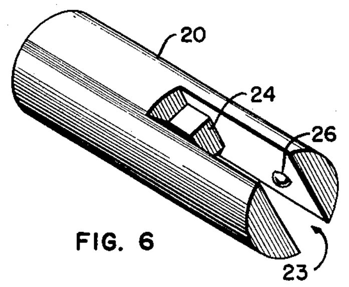
FIG. 6 is an enlarged isometric view of the shaft of the tape winder.

The shaft 20 of tape winder 22, as may be seen in FIG. 6, is provided with a slot 23 for receiving the tape winder cards 10 and 12, a boss 24 within the slot for entering the rectangular notches 15 and 16 in the cards and positioning the cards, and spring loaded ball detents 25 and 26, located in opposite walls of the slot, cooperate with the recesses 19 and 21, respectively, to retain the cards within the slot.

Figure 2:
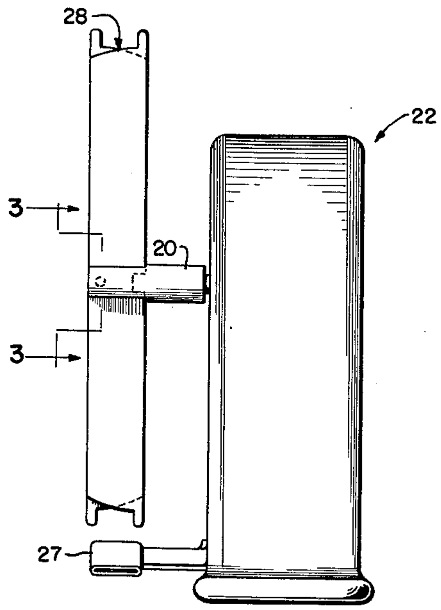
FIG. 2 is an elevational view of the tape winder cards assembled in superposed relation and mounted on the shaft of a tape winder for rotation.
Figure 3:
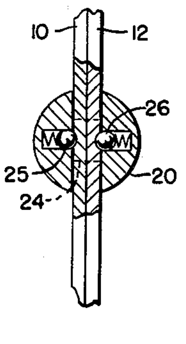
FIG. 3 is an enlarged irregular sectional view of the assembled card winders, taken along the line 3—3 in FIG. 2 showing the manner in which the cards are mounted on the tape winder.

To mount the winder cards for rotation, the cards are placed in superposed relation, as shown in FIG. 2, and inserted within the slot 23. The winder card rectangular notches 15 and 16 fit over the boss 24 and the recesses 19 and 21 receive the spring loaded ball detents 25 and 26 as shown in FIG. 3 whereby, the winder cards are positioned and retained within the slot 23 of the shaft 20.

With the winder cards 10 and 12 mounted on the tape winder 22, as shown in FIG. 2, the free end of the tape 30 to be wound is fed through the tape guide 27 and inserted between the tape winder cards at 28, the free end of the tape 30 will be retained between the cards. The tape winder 22 is now actuated and the tape is wound upon the tape winder cards in the form of an elongated loop. It will be noted that the slotted portion of the shaft 20 will also be disposed within the loop of tape as it accumulates on the cards 10 and 12, that is, the tape will be spread apart from the central portions of the tape winder cards 10 and 12 since the slotted shaft surrounds the tape winder cards for their entire width. Thus the loop of tape will fit somewhat loosely on the tape winder cards. Upon the completion of the tape winding operation, the tape winder cards 10 and 12 are removed manually from the tape winder 22, a rubber tape grip 29 is placed on the tape 30 to clamp the loose end of the tape to the tape loop, and the winder cards with the tape wound thereon are placed in the tape container 31 for temporary storage.

Figure 4:
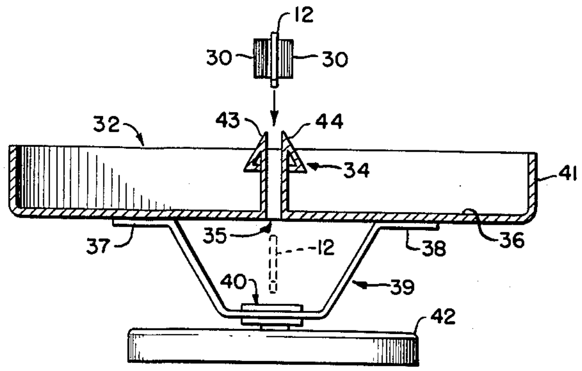
FIG. 4 is an elevational view, partially in section, of a tape supply reel for removing and receiving an elongated tape wound upon a tape winder card; a tape winder card, with tape wound thereon, being shown in solid outline prior to being placed upon the tape removing device and shown in dashed outline after having passed through the tape removing device and having the tape removed therefrom.
Figure 5:
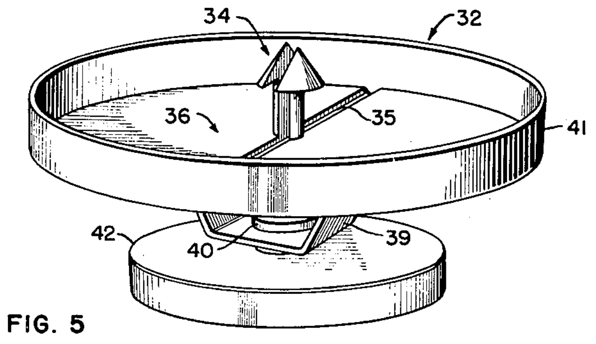
FIG. 5 is an isometric view of the tape supply receptacle.
Figure 7:
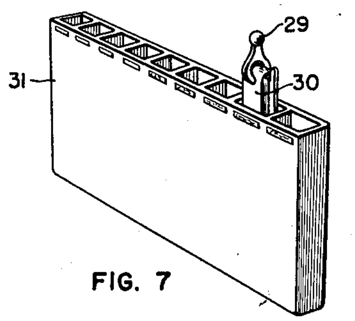
FIG. 7 is an isometric view of a container for storing the tape while wound upon the winder cards.

Referring now to FIGS. 4 and 5, a pan-shaped tape supply receptacle 32 for removing the tape 30 wound upon the winder cards 10 and 12 and receiving the tape, is provided with a base 36, a centrally disposed split cone-shaped center post 34, and a peripheral tape retaining flange 41. A slot 35, longer and wider than the length and thickness, respectively, of a winder card, is formed in the bottom 36 of the receptacle 32 and is aligned vertically with the split in the center post 34. The tape removing receptacle 32 is secured to arms 37 and 38 of a generally U-shaped bracket 39. The lower portion of the bracket 39 is mounted in a free wheeling bearing 40 which is secured to a base 42. Thus, the receptacle 32 can be rotated readily whereby a tape loop that has been deposited therein may be withdrawn by tape handling equipment, such as a tape reader.

The method of transferring a tape loop from an assembly of tape storage cards 10 and 12 to receptacle 32 will now be set forth in detail in order to facilitate an understanding of its operation. The stored tape winder cards 10 and 12 are removed from the container 31 and the rubber tape grip 29, which clamps the loose end of the tape to the cards, is removed. One of the tape winder cards, for example 10, is withdrawn manually from the wound tape loop 30. This withdrawal is permitted by the sloping ends 17—17 and by the fact that the tape is somewhat loosely wound because in the winding process the winding body included the shaft 20. The tape winder card 12 now having the tape loop 30 wound thereon, is placed over the tape receptacle 32, as shown in FIG. 4, with the edge having the rectangular notch 16 formed therein facing downward. The tape card 12 is then pushed downwardly through the split cone 34 whereupon the points 43 and 44 wedge between the tape 30 and the sides of the card 12 to spread the tape away from the sides of the card. Continued downward movement of the card 12 forces the card through the slot 35 in the receptacle 32, as is represented by the dashed-line view of the card 12 in FIG. 4, whereupon it may be withdrawn from between arms 37 and 38 of the receptacle. The freed tape 30 now tends to assume a concentric circular position around the cone 34 and is retained by the peripheral tape retaining flange 41 of receptacle 32.

The inner end of the tape 30 may now be fed into a suitable tape reader, or any other device, and the tape removing receptacle 32 will serve as a reel-like container as the tape is being fed therefrom.

It is manifest that many variations and adaptations may be made of the specific embodiment herein set forth without departing from the spirit and scope of the present invention.

The embodiments of the invention in which an exclusive property or privilege is claimed are defined as follows:

1. A device for removing an accumulation of tape wound on a flat member, which comprises a generally cone-shaped member split into two half cones spaced apart a distance slightly exceeding the thickness of the flat member whereby said flat member may be passed between the half-cones, the points of the half-cones being adapted to wedge between the tape and the flat member and force the tape away from the sides of the flat member upon passage of the flat member between the half-cones.

2. A tape supply receptacle adapted to receive tape from a flat card about which a length of tape is normally wound for storage, said receptacle comprising a flat base having a slot dimensioned to accommodate passage of the card therethrough and a peripheral tape-retaining flange, and a split post having a conical head and having the two halves of the post mounted on opposite sides of said slot to permit passage of the card between the halves of said post, said conical head serving to strip the winding of tape from the card and transfer the tape to the receptacle as the card is passed through the slot.

3. A device adapted to remove a tape wound in superposed turns lengthwise of an elongated flat member and to support the tape in a reel-like manner, which comprises a pan-shaped receptacle having in the bottom a diametrical slot slightly greater in length than the flat member and slightly greater in width than the thickness of the flat member, and a substantially cone-shaped member centrally disposed in the pan-shaped receptacle, said cone-shaped member being comprised of two half-cone members mounted at the opposite edges of said slot midway of the ends thereof, the points of said half-cones adapted upon passage of said flat member edgewise between them and through said slot to wedge between the tape and the surfaces of the flat member across the width of the flat member and force the tape away from the flat member, said pan-shaped receptacle adapted to intercept said tape and contain it in reel-like fashion within the confines of said pan-shaped receptacle.

4. A tape supply reel adapted to receive tape wound lengthwise on a flat card for storage, which comprises a flat base having a diametrical slot slightly longer than the length and slightly wider than the thickness of the flat card, a peripheral tape retaining flange, and a split cone-shaped center post centrally disposed upon the base having the two half-cones thereof mounted on opposite edges of said slot, the points of said half-cones serving to strip the tape from the flat card by wedging between the tape and the adjacent surfaces of the card upon passage of the card between the half-cones and through the slot whereupon the freed tape tends to assume a concentric circular position around the center-post and is retained upon the base by the tape retaining flange.

5. A tape supply reel adapted to receive tape wound lengthwise on a flat card for storage, said reel comprising a flat base having a diametrical slot and a peripheral tape retaining flange, said slot being slightly longer than the length and slightly wider than the thickness of said flat card, a split cone-shaped center post disposed upon the base, the two half-cones of said center-post being mounted on opposite edges of said slot, the points of said half-cones serving to strip the tape from the flat card by wedging between the tape and the adjacent surfaces of the card upon passage of the card between the half-cones and through the slot, said tape thereupon tending to assume a concentric circular position about the center post and being retained upon the base by the tape retaining flange, and a rotatably mounted bracket secured to the base to permit rotation of the supply reel.

6. A tape supply reel adapted to receive tape wound lengthwise on a flat card for storage, said reel comprising a flat base having a diametrical slot and a peripheral tape retaining flange, said slot being slightly longer than the length and slightly wider than the thickness of said flat card, a split cone-shaped center post disposed upon the base, the two half-cones of said center-post being mounted on opposite edges of said slot, the points of said half-cones serving to strip the tape from the flat card by wedging between the tape and the adjacent surfaces of the card upon passage of the card between the half-cones and through the slot, said tape thereupon tending to assume a concentric circular position about the center post and being retained upon the base by the tape retaining flange, a bracket having spaced arms secured to said base to accommodate passage of the card through the slot and removal of the card, and means for rotatably mounting said bracket to permit rotation of the supply reel.

References Cited in the file of this patent

UNITED STATES PATENTS

| | | |
|---|---|---|
| 554,934 | Johnson et al. | Feb. 18, 1896 |
| 1,115,684 | Knapp | Nov. 3, 1914 |
| 1,291,368 | Bass | Jan. 14, 1919 |
| 1,300,655 | Rubenstein | Apr. 15, 1919 |
| 1,762,386 | Collingbourne | June 10, 1930 |